Oct. 12, 1948.  E. B. THURSTON  2,451,257
HOISTING MOTOR CONTROL SYSTEM
Filed April 4, 1944
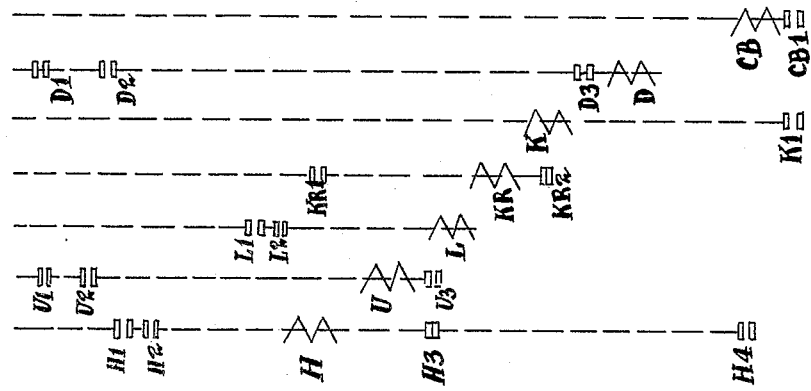
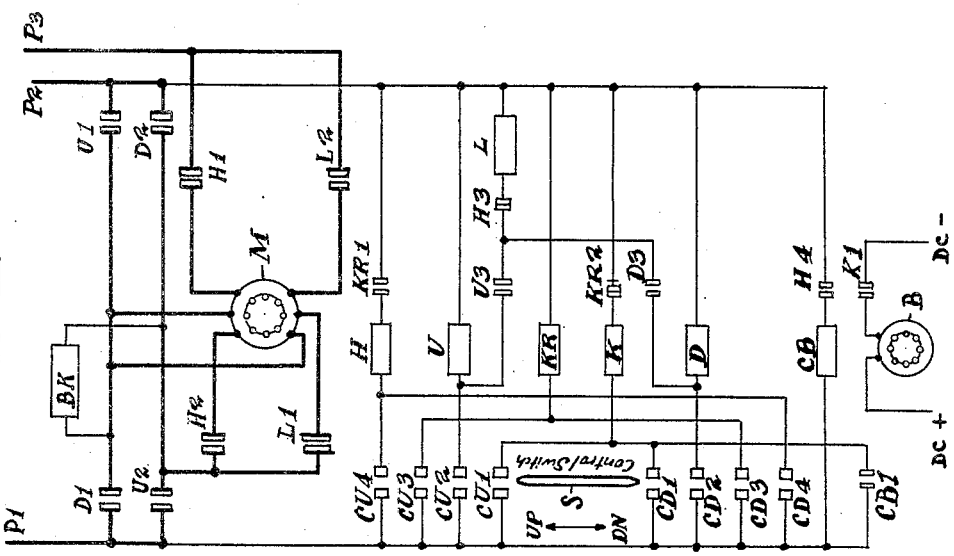
Inventor
ERNEST B. THURSTON
By Owen & Owen
Attorneys Patented Oct. 12, 1948

2,451,257

UNITED STATES PATENT OFFICE 2,451,257

HOISTING MOTOR CONTROL SYSTEM

Ernest B. Thurston, Toledo, Ohio, assignor to The Haughton Elevator Company, Toledo, Ohio, a corporation of Ohio Application April 4, 1944, Serial No. 529,457

8 Claims. (Cl. 318—258)

This invention relates to the gradual stopping of an alternating current motor. It is particularly useful with a motor for a hoist, such as a winch, elevator, or the like.

With an elevator, it is obviously advantageous to start and stop the car gradually. Where a winch is employed to load or unload ships or for like purposes, similar considerations apply. Sometimes a low, controlled starting speed is desirable, as where a load is lifted only slightly to shift it or for other purposes. It is not generally possible to operate the motor so as to halt the load at the exact point where it reaches its intended support. When the load is moving rapidly when it reaches the support, an injurious jar is apt to result. If the load is stopped before it quite reaches its support, time is consumed in again starting the motor to complete the lowering.

The difficulties mentioned are mitigated to some extent by employing a multi-speed motor by which the greater part of the movement may be effected rapidly, while the final movement is at relatively low speed, but the low speed of the hoist motor is still so great as to render abrupt stoppage undesirable.

This invention applies an eddy current brake to a motor having a drooping characteristic to its low speed. Broadly, the same idea might be applied to a hoist motor having but one speed, but ordinarily it is preferable to employ a multi-speed motor and to use the eddy current brake only with the low speed. Also, the principles involved might be applied to a one direction motor, but for most hoisting and like operations, a reversing motor is used.

Further details and objects of the invention will appear as the description proceeds in connection with the accompanying drawings, in which Fig. 1 is a diagrammatic illustration of one application of the invention and Fig. 2 is a diagrammatic indication of the relation of the switches to their operating coils.

In these drawings there is indicated a three phase two speed alternating current motor shown at M, the low speed having a drooping characteristic. At B there is shown diagrammatically an eddy current brake. The general arrangement is such that the eddy current brake slows down the low speed of the motor as the stop position is approached.

In the construction shown, there is a control switch S which may be manually operated. When moved upward from the inoperative position in which it is shown on the drawings the contacts CU1 are closed first. This closes the circuit from powerline P1 through coil K to powerline P2. The energizing of coil K closes switch K1 which energizes the eddy current brake with a direct current from any suitable source, as indicated on the drawing.

Continued movement of the control switch in the up direction closes switch CU2 which passes current through coil U from powerline P1 to powerline P2. The energizing of coil U closes switches U1, U2 and U3. The closing of switch U1 connects one side of motor M with powerline P2. The closing of switch U3 energizes coil L in parallel with coil U and closes switches L1 and L2. The closing of L1 connects the motor with powerline P1 through already closed switch U2, and the closing of switch L2 connects the motor with powerline P3 and thus energizes the motor for low speed. The eddy current brake, having been already energized, resists the action of the motor and results in a gradual starting of the motor, if desired.

Further movement of the control switch in the up direction closes switch CU3 which in turn energizes coil KR. The energizing of coil KR opens switch KR2 and de-energizes coil K which in turn results in opening switch K1 and thus de-energizing the eddy current brake, allowing the unresisted action of the low speed of the motor. If rapid starting is desired, the switch may be moved promptly from the off position to the position where CU3 is closed.

Further movement of the control switch in the up direction closes switch CU4. Since the prior closing of switch CU3 and energizing of solenoid KR has closed switch KR1, the closing of switch CU4 energizes solenoid H. Solenoid H opens switch H3, de-energizing solenoid L so that switches L1 and L2 are opened. At the same time, switches H1 and H2 are closed, thus connecting powerline 1 and powerline 3 for high speed operation of the motor. It will be noted that the construction is such that the high speed connections will be interrupted by normally opened switch KR1 if solenoid KR fails to operate. In this way the de-energizing of the eddy current brake is positively insured prior to the energizing of the high speed connections of the motor.

It will be readily seen that when the control switch is moved in the opposite direction, the opposite sequence of events occurs. First the opening of switch CU4 de-energizes the high speed circuits of the motor and connects the low speed circuits of the motor. Further movement of the control opens switch CU3, de-energizing coil KR and allowing coil K and the eddy current brake to be energized, thus employing the brake to slow down the low speed operation of the motor. The operation of the eddy current brake with the low speed motor having a drooping characteristic enables the movement to be gradually slowed down so as to avoid any abrupt stopping of the motor. This is important in many instances to avoid any jar when a load lowered by a winch comes in contact with its destined support, or an elevator is brought to a halt.

When the control switch is moved to off position the eddy current brake is de-energized, but when the switch is moved quickly from high speed position to off position, the action of the brake in slowing down the movement is desirable. For this purpose, there is provided a circuit through switch CB1 for energizing coil K and thereby energizing the brake. Switch CB1 is closed by energizing coil CB, which in turn is energized by the closing of switch H4 by coil H. Coil H is energized at high speed, and de-energized when the high speed switch is opened, but there is a timed delay in opening switch CB1 after coil H is de-energized, so that the brake continues to be energized for a predetermined time after the switch is moved rapidly from high speed to off position.

The movement of the control switch in the down direction closes in succession switch CD1 which energizes coil K as described in connection with the up direction control. Further downward movement closes switch CD2 which energizes coil D, which in turn closes switches D1, D2 and D3, the closing of switch D3 energizing coil L which in turn closes switches L1 and L2. This connects the motor for movement in the opposite direction at low speed, this low speed being resisted by the eddy current brake. Further movement of the control switch in the down direction closes switch CD3 which in turn energizes coil KR with the results the same as described in connection with the up movement. Still further movement of the control switch in the down direction closes switch CD4 which in turn energizes coil H, resulting in de-energizing coil L and opening of switches L1 and L2. Movement of the control switch back to the neutral position will result in the same sequence of operations as its movement from the up position as described previously.

From the foregoing it will be seen that apparatus has been devised by which an alternating current motor may be started and stopped gradually with a minimum of danger of the slowing-down brake failing to function when needed or remaining energized when not desired. While one arrangement has been shown in some detail, many changes may be made within the scope of the appended claims while retaining many of the advantages of the invention.

For example, switch CB1, instead of being controlled by a timing device to remain closed for a predetermined time after the high speed circuit is opened, might be controlled by a speed governor and remain closed until the speed drops below a predetermined limit. Also, switches CU1 and CD1 are indicated as being closed before CU2 or CD2 when the motor is started in the respective direction. While this is sometimes preferable in order to build up the magnetism in the eddy current brake where slow starting is essential, for most purposes switches CU1 and CD1 may be opened and closed simultaneously with switches CU2 and CD2 respectively, although that operation is difficult to indicate on a diagrammatic drawing of the type used. Other obvious modifications will occur to those skilled in the art.

What I claim is:

1. In a hoist device, a hoist motor of the multi-speed alternating current type having a plurality of stator windings with different synchronous speeds and a drooping characteristic in its low speed, an eddy current brake, and a control switch having at least 4 positions through which it is movable in succession from off position to and from high speed position, such positions being, in the order named, an off position, a position in which the brake and the low speed of the motor are energized, a position in which the low speed of the motor is energized and the brake is de-energized, and a position in which the high speed of the motor is energized and the brake remains de-energized.

2. In a hoist device, a hoist motor of the multi-speed alternating current type having a plurality of stator windings with different synchronous speeds and a drooping characteristic in its low speed, an eddy current brake, and a control switch which has at least 5 positions through which it is movable in succession from off position to and from high speed position, such positions being in order an off position, a position in which the brake is energized but the motor is not energized, a position in which the brake is energized and the motor is energized at low speed, a position in which the motor is energized at low speed and the brake is de-energized and a position in which the motor is energized at high speed and the brake remains de-energized.

3. In a hoist apparatus, a reversing, multi-speed, alternating current motor having a low speed with a drooping characteristic, an eddy current brake, and a control switch movable from and to an off position in opposite directions successively through a position in which the brake and the low speed of the motor are energized, a position in which the brake is de-energized and the low speed of the motor is energized, and a position in which the brake remains de-energized and the high speed of the motor is energized.

4. In a hoist apparatus, a reversing, multi-speed alternating current motor having a low speed with a drooping characteristic, an eddy current brake, and a control switch movable from an off position in opposite directions through positions for energizing the brake and energizing the motor in opposite directions, the switch moving in each direction from off position first through a position in which the brake is energized, secondly through a position in which both the brake and the low speed of the motor are energized, thirdly through a position in which the brake is de-energized and the low speed of the motor is energized and thereafter to a position in which the high speed of the motor is energized and the brake remains de-energized.

5. In a hoist device, a hoist motor of the multi-speed alternating current type having a plurality of stator windings and a drooping characteristic in its low speed, an eddy current brake, and a control switch having at least four positions through which it is movable in succession from off position to and from high speed position, such positions being, in the order named, an off position, a position in which the brake and the low speed of the motor are energized, a position in which the low speed of the motor is energized and the brake is de-energized, and a position in which the high speed of the motor is energized and the brake remains deenergized, and means to continue the energizing of the brake when the control switch is moved quickly from high speed position to off position.

6. In a hoist device, a hoist motor of the multi-speed alternating current type having a plurality of stator windings and a drooping characteristic in its low speed, an eddy current brake, and a control switch having at least four positions through which it is movable in succession from off position to and from high speed position, such positions being, in the order named, an off position, a position in which the brake and the low speed of the motor are energized, a position in which the low speed of the motor is energized and the brake is de-energized, and a position in which the high speed of the motor is energized and the brake remains deenergized, and means for continuing the energizing of the brake when the control switch is moved to its off position until the expiration of a predetermined time after the switch has been moved from high speed position.

7. In a hoist device, a hoist motor of the multi-speed alternating current type having a plurality of stator windings and a drooping characteristic in its low speed, an eddy current brake, and a control switch having at least four positions through which it is movable in succession from off position to and from high speed position, such positions being, in the order named, an off position, a position in which the brake and the low speed of the motor are energized, a position in which the low speed of the motor is energized and the brake is de-energized, and a position in which the high speed of the motor is energized and the brake remains deenergized, and a circuit by-passing the brake-energizing line which is closed by the control switch in its second said position, a switch in the by-pass, and means closing the last said switch while the motor is above a predetermined speed.

8. In a hoist device, a hoist motor of the multi-speed alternating current type having a plurality of stator windings and a drooping characteristic in its low speed, an eddy current brake, and a control switch having at least four positions through which it is movable in succession from off position to and from high speed position, such positions being, in the order named, an off position, a position in which the brake and the low speed of the motor are energized, a position in which the low speed of the motor is energized and the brake is de-energized, and a position in which the high speed of the motor is energized and the brake remains de-energized, and a switch in the high speed connections and means for simultaneously closing the last said switch and de-energizing the brake and vice versa.

ERNEST B. THURSTON.

REFERENCES CITED

The following references are of record in the file of this patent:

UNITED STATES PATENTS

| Number | Name | Date |
|---|---|---|
| 1,011,783 | Hellmund | Dec. 12, 1911 |
| 2,231,662 | Drake et al. | Feb. 11, 1941 |